United States Patent [19]

Czech et al.

[11] 4,301,948
[45] Nov. 24, 1981

[54] DISPENSER FOR PASTE-LIKE PRODUCTS WITH A MANUALLY ACTUATABLE PISTON

[75] Inventors: Joachim Czech, Jahnstrasse 19, D-8405 Donaustauf, Fed. Rep. of Germany; Hans D. Sieghart, Moosburg, Fed. Rep. of Germany

[73] Assignee: Joachim Czech, Donaustauf, Fed. Rep. of Germany

[21] Appl. No.: 102,893

[22] Filed: Dec. 12, 1979

[30] Foreign Application Priority Data

Jan. 17, 1979 [DE] Fed. Rep. of Germany ....... 2901717

[51] Int. Cl.³ .............................................. B67D 5/40
[52] U.S. Cl. ................................. 222/341; 92/130 B; 239/333; 417/437; 417/560
[58] Field of Search ............... 222/207, 209, 212, 213, 222/214, 215, 340, 341, 383; 417/437, 470, 559, 560; 239/329, 331, 333; 92/130 B

[56] References Cited

U.S. PATENT DOCUMENTS

| | | | |
|---|---|---|---|
| 2,690,278 | 9/1954 | Bacheller | 222/207 |
| 3,162,333 | 12/1964 | Davidson | 222/207 |
| 3,162,334 | 12/1964 | Miller | 222/207 |
| 3,361,305 | 1/1968 | Spatz | 222/207 |
| 3,486,503 | 12/1969 | Porter et al. | 222/215 X |
| 3,768,705 | 10/1973 | Spatz | 222/213 |
| 4,155,487 | 5/1979 | Blake | 222/207 |

*Primary Examiner*—Robert J. Spar
*Assistant Examiner*—Fred A. Silverberg
*Attorney, Agent, or Firm*—James E. Nilles

[57] ABSTRACT

This invention relates to a dispenser for paste-like products of the type having a container containing a product and closed at one end by a slidable piston in sealing engagement with the inner wall surface thereof, the other end being provided with a head member carrying on applicator and forming a pump chamber the volume of which is variable by the exertion of exterior pressure, the pump chamber being closed towards said container by a first check valve adapted to open only towards the pump chamber, and towards the outlet of the applicator by a second check valve adapted to open only towards said outlet.

4 Claims, 8 Drawing Figures

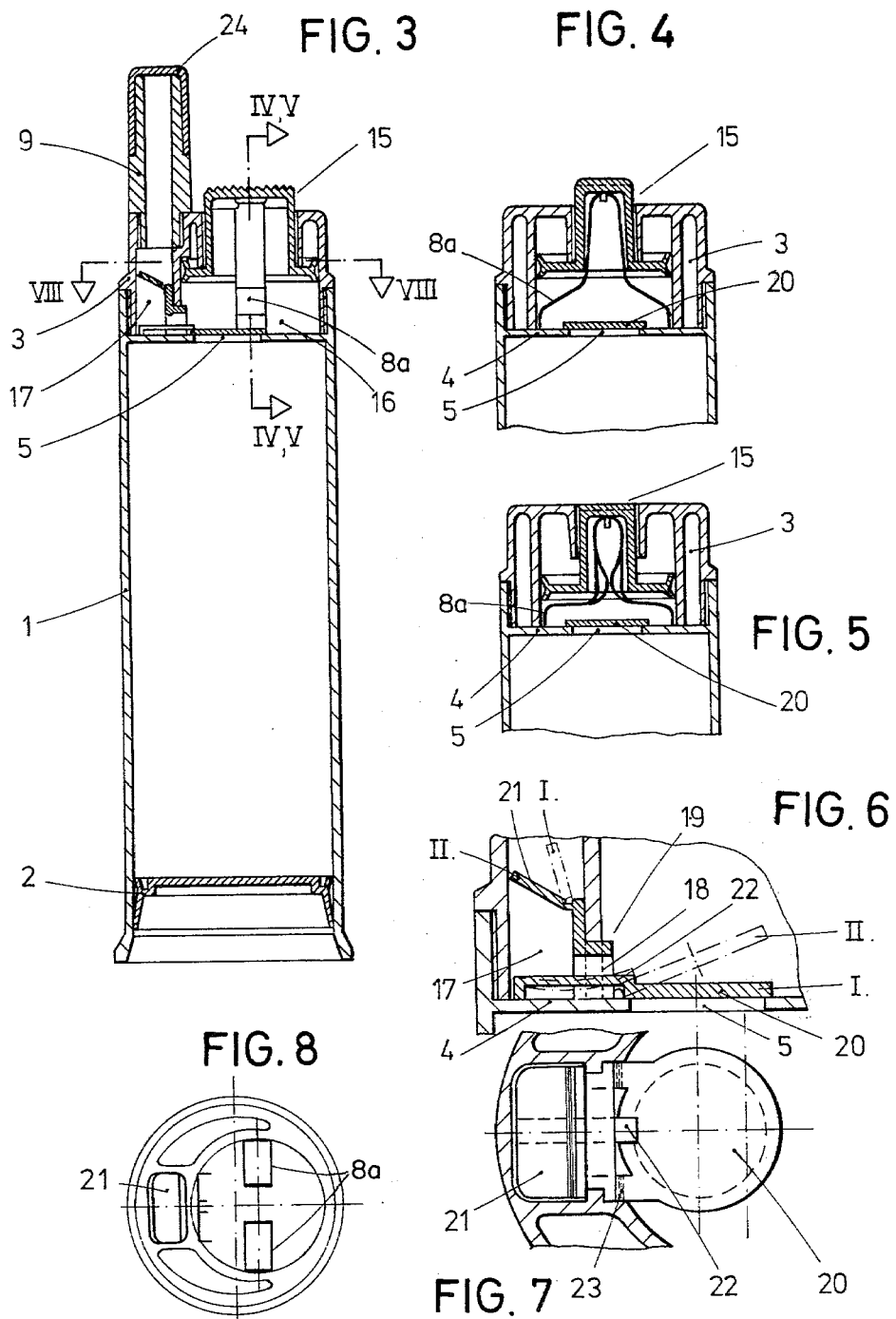

DISPENSER FOR PASTE-LIKE PRODUCTS WITH A MANUALLY ACTUATABLE PISTON

BACKGROUND OF THE INVENTION

A dispenser of this type is known from U.S. Pat. No. 3,361,305. The dispenser described therein has a pump chamber defined by a concave conical separation wall extending towards the interior of the container and an upwardly projecting conical membrane, with an outlet passage opening into said pump chamber at a position between said separation wall and said membrane and provided with the second check valve formed by a ball member and an associated valve seat. The separation wall is formed with a number of openings covered by a corresponding number of resilient flaps lying on said separation wall to form said first check valve by cooperation with the openings. After filling the container with the product to be dispensed, insertion of the closure piston in sealing engagement with the interior wall surface causes the product to flow through the openings of the first check valve into the pump chamber, so that the latter is substantially filled with the product in its expanded state. For dispensing the product, an exterior pressure is exerted on the membrane as with the thumb of a hand, causing the volume of the pump chamber to be reduced, whereby the product contained within the pump chamber is dispensed through the opened second check valve and the outlet passage. During this reduction of the pump chamber volume, the product cannot escape back towards the container, since the resilient flaps are firmly pressed down over the openings in the separating wall, so that the first check valve is closed. After the product has been displaced out of the pump chamber, the membrane is released, so that the volume of the pump chamber is again increased, whereby a suction force is produced to close the second check valve, preventing any outside air from entering the pump chamber through the outlet passage. The vacuum resulting from the increase of the pump chamber volume causes the first check valve to open by lifting the resilient flaps off the openings in the separation wall, so that the product may again flow from the container into the pump chamber to replenish the product supply therein. This known dispenser does not permit accurate metering of the product dispensed at a single stroke, since the membrane is returned to its original position only by virtue of its inherent resiliency, is subjected to fatigue effects and restricts the maximum volume of the pump chamber to a rather limited value.

SUMMARY OF THE INVENTION

It is therefore an object of the invention to improve the dispenser defined in the introduction, enabling it to dispense substantially equal amounts of a product at each complete volume variation cycle of the pump chamber even in case of a relatively great pump chamber volume.

To attain this object, the invention provides a dispenser of the type defined in the introduction, wherein the pump chamber is of substantially cylindrical shape and is closed by a piston face displaceable relative thereto, and wherein there is provided a return spring for effecting said relative displacement in one direction.

Due to the substantially cylindrical configuration of the pump chamber, the volume of which is variable by the relative motion of a piston face with respect to the interior wall surface of the cylindrical pump chamber, the volume even of a relatively large chamber can be reproducibly varied by controlling the stroke of the piston face. The provision of a separate return spring for effecting the relative movement between the piston face and the cylindrical pump chamber in the direction of a volume increase ensures accurate return of the dispenser to its rest position even after repeated actuation.

In accordance with a first preferred embodiment of the invention, the cylindrical pump chamber is formed by a cap mounted for longitudinal sliding motion on the container, the piston face in this case being formed by the upper separation wall of the container between it and the head member. In this case, the piston face may thus be considered stationary, while the cap forming the side wall and the upper end wall of the pump chamber are movable. The volume of the pump chamber is thus reduced by sliding the cap onto the container.

In a second preferred embodiment of the invention, the cylindrical pump chamber is stationary and contains a piston adapted to be manually depressed for reducing the pump chamber volume.

BRIEF DESCRIPTION OF THE DRAWINGS

FIG. 3 shows a longitudinal section of a second embodiment of the invention, FIG. 4 shows a sectional view of the head portion along the line IV—IV in FIG. 3, FIG. 5 shows a view corresponding to FIG. 4 in a state of maximum reduction of the pump chamber volume;

FIG. 6 shows an enlarged sectional view of an injection molded member forming two check valves, FIG. 7 shows an enlarged top plan view of the injection molded member, and FIG. 8 shows a sectional view taken along the line VIII—VIII in FIG. 3.

DESCRIPTION OF THE PREFERRED EMBODIMENT

Figure 1:
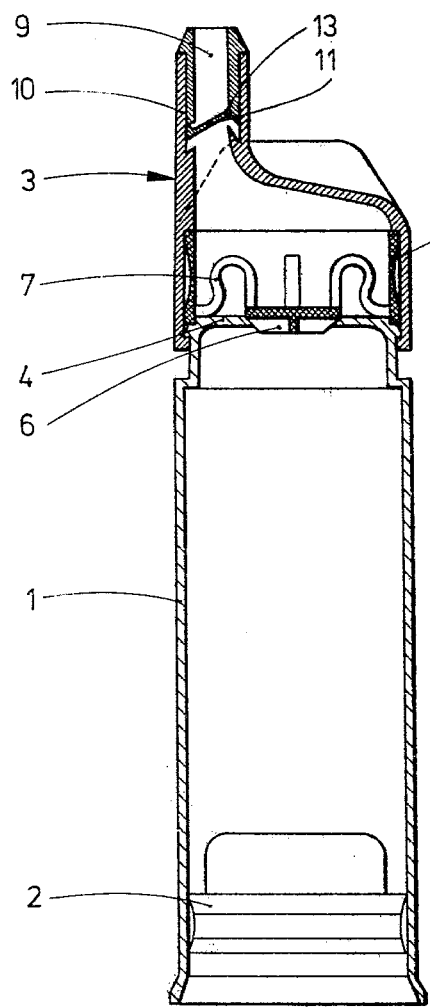
FIG. 1 shows a longitudinal sectional view of a first embodiment of the invention in the rest position.
Figure 2:
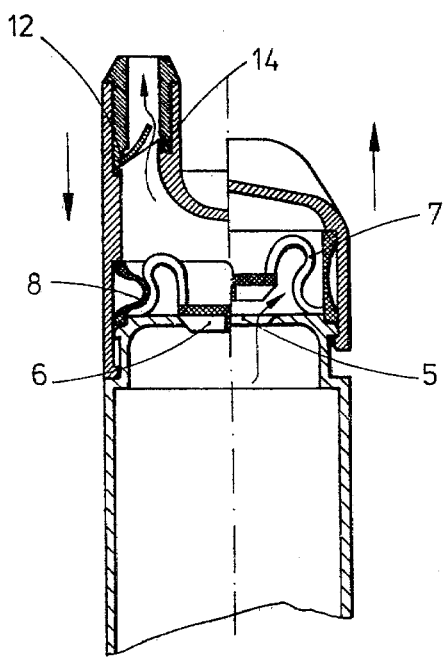
FIG. 2 shows the embodiment of FIG. 1, the lefthand half section showing the pump chamber volume while it is being reduced, and the righthand half section showing the pump chamber volume during expansion thereof.

In the first embodiment shown in FIGS. 1 and 2, a dispenser comprises a substantially cylindrical container 1 formed of a synthetic resin such as polypropylene, for receiving the product to be dispensed. The lower end of container 1 is closed by a piston 2 slidably supported in sealing engagement with the interior wall surface of container 1 for reducing the volume thereof during each discharge of the product therefrom, so that the container retains its outer shape while the formation of a vacuum or the accumulation of air within the container is prevented. At its upper end, container 1 carries a head member 3 in the form of a substantially cylindrical cap slidingly supported on the outer sidewall surface of container 1. To this effect, the container 1 shown in this embodiment has the outer sidewall surface of its upper portion slightly offset towards the center, so that the outer sidewall surface of head member 3 extends in substantial alignment with the outer sidewall surface of the main portion of the container 1.

The separation wall 4 between container 1 and head member 3 provides a piston face cooperating with slidably mounted head portion 3, so as to vary the volume of a pump chamber defined by said piston face and the interior faces of the cap 3 by relative movement between cap 3 and separation wall 4. Separation wall 4 is provided with an opening 5 formed with a valve seat for cooperation with a valve closure member 6 retained by resilient webs 7.

Located within cap 3 and acting as a return spring is a resilient sleeve 8 closely adjacent and parallel to the cap's peripheral wall, the ends of sleeve 8 being fixedly attached to separation wall 4 and cap 3, respectively.

In the embodiment shown, applicator 9 has its outlet passage closed adjacent its lower end by a resilient flap 11 connected to the interior wall surface of the outlet passage by a first web portion 12 forming a resilient although relatively stiff hinge between the flap and the interior wall surface of the applicator. Substantially opposite web portion 12 there is provided a relatively thin second web portion 13 designed to completely close the outlet passage.

As applicator 9 is completely inserted into sleeve portion 10 of head member 3, the relatively thin second web portion 13 of resilient flap 11 is severed by a cutting edge portion 14 projecting from the interior wall surface of sleeve portion 10, so that the flap is movably supported within the outlet passage by the hinge formed by first web portion 12. Resilient flap 11 thus acts as a second check valve, a first check valve being formed by closure member 6 and opening 5 in separation wall 4.

As particularly shown in the lefthand half section of FIG. 2, depression of head member 3 causes the pump chamber volume to be reduced, so that the product contained in the pump chamber is forced outward through the outlet passage of applicator 9, the pressure generated within the pump chamber causing the second check valve to be opened by pivoting flap 11 about the hinge formed by first web portion 12. The pressure increase resulting from the reduction of the pump chamber volume results in closure member 6 being pressed down onto the valve seat formed around opening 5, so that there is no communication between the interior of container 1 and the pump chamber. As clearly shown in FIG. 2, depression of head member 3 for reducing the pump chamber volume results in the return spring formed by resilient sleeve 8 being deformed so that its intermediate portion bulges inwardly towards the pump chamber.

As soon as the pressure urging head member 3 downwards is released, head member 3 slides back upwards under the biasing force of the return spring, whereby the pump chamber volume is again increased. This increase of the pump chamber volume generates a vacuum causing a portion of the product within the outlet passage of applicator 9 to be sucked back into the pump chamber, which results in flap 11 closing immediately. On the other hand, the vacuum within the pump chamber causes closure member 6 to be lifted off opening 5 in separation wall 4, so that the product may now flow from the interior of container 1 into the pump chamber until it is again filled with the product, whereupon the pressure differential between the pump chamber and the interior of container 1 disappears, causing closure member 6 to drop back onto opening 5.

FIGS. 3 to 8 show a second embodiment of the invention, wherein components corresponding to those shown in FIGS. 1 and 2 are designated by the same reference numerals.

The main difference between the two embodiments lies in the construction of head member 3. The head member 3 of the second embodiment contains a slidable piston 15 which may be depressed to reduce the volume of a pump chamber 16. As clearly shown in FIGS. 3 and 4, the upper actuating portion of piston 15 is formed as a generally rectangular push button, there being provided a return spring 8a in the form of a leaf spring having its central portion formed into a substantially conical profile projecting through an opening of the piston face into a cavity formed by the generally rectangular push button at the upper portion of piston 15.

In addition to the substantially cylindrical pump chamber 16, head member 3 includes an outlet passage 17 connected to pump chamber 16 via a connecting passage 18.

As particularly shown in FIGS. 6 and 7, connecting passage 18 is formed by an integrally formed injection molded member 19 also carrying the resilient flaps of the first and second check valves. A first resilient flap 20 again covers a through opening 5 in separation wall 4 between container 1 and head member 3. A second resilient flap 21 serves to close outlet passage 17 upstream of applicator 9. Integrally formed with injection molded member 19 is a portion 22 acting as a leaf spring biasing resilient flap 20 towards its closed position. As shown in FIG. 7, the hinges between flap 20 and the remainder of injection molded member 19 may be formed by suitable recesses 23 at the underside of the injection molded member.

As shown in FIG. 3, applicator 9 may be provided with a closure cap 24 for sealing the dispenser.

For facilitating the employ of the product contained in the container, the applicator employed for the dispenser may be of any suitable size, length, shape and construction. On the other hand, the applicator may be integrally formed with the head member, while in the case of very long applicators for particular use as in the medical field for anal or vaginal medication, a two-piece construction would be indicated, if only for ease of production.

Operation of the embodiment of FIGS. 3 to 8 is essentially the same as in the case of the first embodiment, the pump chamber volume being reduced by depressing piston 15, and again increased by the subsequent upward movement of piston 15 under the biasing force of return spring 8a. The two check valves operate in the same manner as in the first embodiment, The deformation of return spring 8a by the movement of piston 15 is clearly evident from FIGS. 4 and 5.

The diagrammatic sectional view of FIG. 8 shows portions of return spring 8a and the elastic flap 21 of the second check valve.

The return springs may be stainless steel or may be injection-molded of Makrolen. The plastic parts of container 1, head member 3, piston 15, and applicator 9 may be formed of polyethylene or polypropylene. These materials ensure substantially complete product stability within the dispenser, since they are physically and chemically unaffected by practically any product to be dispensed.

Examples for the employ of the dispenser are for instance hair and skin cosmetics, oral hygiene, the medical field as well as foodstuffs, it being possible to fill the container with products of any suitable viscosity and composition and to dispense such products.

I claim:

1. A dispenser for paste-like products comprising a container having opposite ends which are spaced apart in a longitudinal direction and one of which is substantially closed by a wall wherein there is a hole, a head member on said one end of the container having a portion that is manually inwardly displaceable against a bias, said head member cooperating with said wall to define a pump chamber into which product can flow from the container through said hole and which has an outlet spaced from said hole, a slidable piston sealingly engaging the inner surface of the container to close its other end, and a pair of check valve elements, one arranged to prevent flow of product through said hole from the pump chamber into the container and the other arranged to prevent inward flow through said outlet towards the pump chamber, said dispenser being characterized by:

A. said outlet being defined by a portion of said head member that is formed as a duct which is in laterally spaced relation to said hole and extends away from said wall in said longitudinal direction; and
   B. said dispenser further comprising an insert member of resilient material confined in said head member and having
      (1) a first flap portion which provides said one check valve element and which normally flatwise overlies said wall to close said hole therein but is flatwise flexible away from said wall,
      (2) a second flap portion providing said other check valve element, said second flap portion being spaced from said wall and normally extending across said duct to prevent inward flow therethrough but being resiliently flatwise flexible away from said wall, and
      (3) a medial portion to which said flap portions have flexing connections for flatwise movement, said connections being substantially parallel to one another, spaced apart in said longitudinal direction, and substantially contained in a plane that extends in said longitudinal direction, and said medial portion being formed to define a channel between said connections which extends transversely through said plane and through which product flows in passing from said hole to the space between said wall and said second-flap portion.

2. The dispenser of claim 1, further characterized by: said flap portions extending edgewise in opposite directions from said medial portion of the insert member.

3. The dispenser of claim 1, further characterized by:
   (1) said portion of the head member that is manually inwardly displaceable being formed as a pump piston having an accessible outer surface formed as a pushbutton, and
   (2) a substantially U-shaped spring in said pump chamber reacting against said pump piston and engaging said wall at opposite sides of said first flap portion.

4. A dispenser for paste-like products comprising a container having upper and lower ends and having its upper end substantially closed by a wall wherein there is a hole, a head member on said upper end of the container having a portion that is manually inwardly displaceable against a bias, said head member cooperating with said wall to define a pump chamber into which product can flow from the container through said hole and which has an outlet, a slidable sealing piston closing the lower end of the container, and a pair of check valve elements, one arranged to prevent flow of product through said hole from the pump chamber into the container and the other arranged to prevent inward flow through said outlet towards the pump chamber, said dispenser being characterized by:

A. said outlet being defined by a portion of said head member that is formed as an upwardly extending duct which is in laterally spaced relation to said hole;
   B. said dispenser further comprising an insert member of substantially resilient material confined in said head member and having
      (1) a medial portion that defines a horizontally extending channel above said wall through which product passes in flowing from said hole into said duct, and
      (2) a pair of flaps, each having a resiliently hinged connection to said medial portion for flatwise swinging motion relative thereto, said flaps extending edgewise in substantially opposite directions from said medial portion,
         (a) one of said flaps providing said one check valve element and having its hinge connection below said channel and adjacent to said wall to normally flatwise overlie the same and close said hole therein, and
         (b) the other of said flaps providing said other check valve and normally extending across said duct with its hinge connection substantially vertically over the hinge connection of said one flap, above said channel, and spaced above said wall.

* * * * *